July 10, 1928.

H. LIEBECK 1,676,653

METHOD AND MEANS FOR PAPER STOCK REFINING

Filed Sept. 22, 1926

Inventor:
Harry Liebeck,
By _____
Attorney.

Patented July 10, 1928.

1,676,653

UNITED STATES PATENT OFFICE.

HARRY LIEBECK, OF SWARTHMORE, PENNSYLVANIA, ASSIGNOR TO SCOTT PAPER COMPANY, A CORPORATION OF PENNSYLVANIA.

METHOD AND MEANS FOR PAPER-STOCK REFINING.

Application filed September 22, 1926. Serial No. 136,926.

My invention relates to the use of what are known as refining engines, such as "Jordans", "Marshalls", "Brushers", "Claflins", "Voights", etc., having for its object an increased action of the knives on the stock, together with greater efficiency in the use of power by recirculation of the stock through the refiner, whereby the knives are caused to act twice on most of the stock, increasing its effectiveness above any of the methods now in use.

My invention is such that it may be applied to or used with any type of refining engine without changing the design or operation of the refining engine itself nor requiring any elaborate and costly changes in piping or pumping arrangements.

Heretofore, in passing paper stock through a refining engine, it has been customary to deliver the stock first to what is known to the trade as a regulating box which maintains a constant level of stock flowing to and through the refining engine, said box having an overflow to dispose of excess stock and a gate or valve for regulating the amount of stock delivered to the refining engine, the stock passing through the refining engine being delivered to the next stage in the paper making process. There are several disadvantages to this method, among which the following may be mentioned:—The refining engine frequently becomes air-bound, causing an irregular discharge of stock, and this makes it exceedingly difficult to maintain a uniform weight of sheet when the refining engine delivers directly to the paper machine. In addition to this, the uneven discharge from the refining engine naturally means that some portions of the paper stock are acted upon more severely than other portions, which is also detrimental to the final product. Having once passed through the refining engine, there is no possibility of further refinement except by the installation of one or more additional or duplicate engines. Moreover, any adjustment in the severity of treatment of the stock passing through the refining engine necessarily means a change in the amount of stock which the refining engine can handle.

My invention provides a simple and effective means of overcoming all the above specified objections, and comprises the features of improvement hereinafter described and more specifically pointed out in the claims.

My invention will be readily understood from the detailed description which follows and by reference to accompanying drawings which form a part of this specification.

Figure 1:
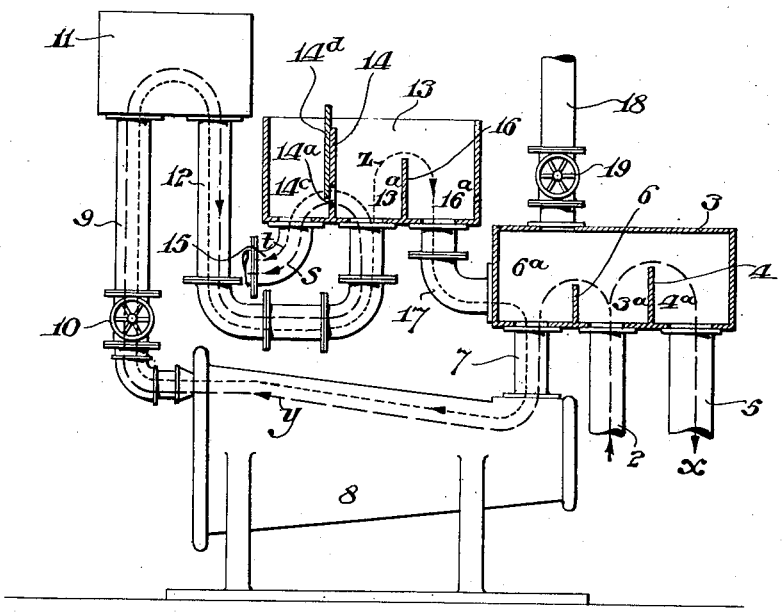
Figure 2:
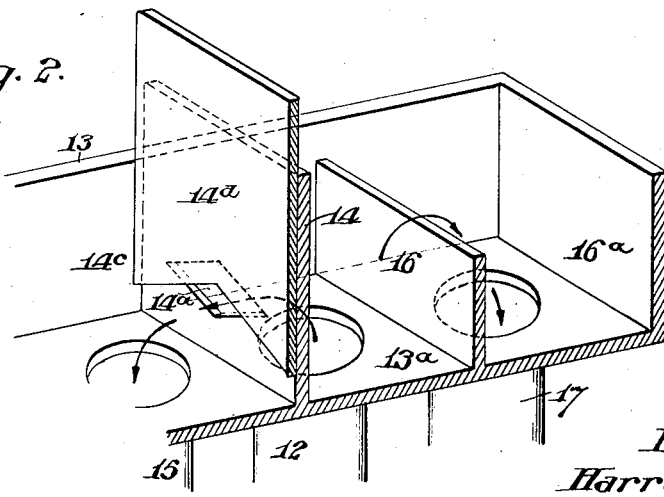

In the drawing: Fig. 1 is a diagrammatic representation of the apparatus of the system as shown in elevation, with part in section; and Fig. 2 is a perspective broken open view of the regulating box.

2 represents a pipe through which paper stock is supplied from any suitable source by a pump (not shown) to the box 3. This box is preferably open to the atmosphere and divided into three compartments by means of two partitions or dams 4 and 6, either or both of which may be varied in height to suit the capacity of the pump and the amount of stock to be passed through the refining engine. When the valve 19 is open, the air is free to enter the box 3 so that it acts as an open box. Pressure above atmosphere may, however, be employed, if desired, to introduce the stock into the refining engine under pressure, and in that event the valve 19 is closed.

When the stock fills the central compartment $3^a$ of the box 3, it overflows the dam 6 into compartment $6^a$, and passes by gravity through the pipe 7 into the refining engine 8. The surplus stock overflows over the dam 4 into the compartment $4^a$ and returns through the pipe 5 to the source of supply. This takes care of an excess capacity of the pump and gives a more uniform supply to the refining engine 8.

The paper stock is suitably broken up in the refining engine 8 and refined to the degree suitable to subsequent requirements. The use and operation of the refining engine is too well known to the industry to require any further specific description.

From the refining engine 8, the stock is forced by the action of the engine itself through the pipe 9 to the elevated open box 11. In the pipe 9 is placed a suitable controlling valve 10 whereby the stock can be held back more or less in the refining engine to secure the best results. From box 11, the stock flows by gravity down through pipe 12 to central compartment $13^a$ of the box 13. This may either be the ordinary and well known regulating box or any one of the automatic stock regulators now in general use, but with my recirculating overflow drain and recirculating pipe 17 added. I have shown here the ordinary regulating box which is hand controlled. As the stock rises in the middle compartment 13ª, it flows through a gate or opening 14ª in the partition 14. The opening 14ª of the gate is readily adjustable by hand operated gate 14ᵈ or in any other suitable manner. The adjustment is made to permit the exact amount of stock needed to pass through into compartment 14ᶜ and onward through pipe 15 to the next stage in the paper making process. The surplus of stock overflows the dam 16 into compartment 16ª and returns through pipe 17, compartment 6ª and pipe 7 to the inlet of the refining engine to receive further treatment. The box 11 may be omitted, if desired, and the pipes 9 and 12 connected so that the refining engine 8 would discharge directly to the regulating box 13; but in practice, the elevated box 11 insures a flow to the regulating box 13 under the action of gravity and static head and is not materially affected by any variations in flow caused by the refining engine itself. Furthermore, the tank 11 having a much greater area than the cross section of the pipe 9, maintains a more steady and uniform flow through pipe 12 to the regulating box.

It will be seen that by the use of box 3 having the high overflow dam 4 for a surplus return of stock, while a low dam is employed in the feed to the engine 8, the inflow to the latter is by a solid body of fluid to the exclusion of air; and likewise, the discharge of the engine into the stand pipe 9 maintains a solid body of fluid to the exclusion of air on the discharge port of the engine also and hence the engine can not become air-bound. The stand pipe also insures a back pressure upon the engine, thereby insuring expulsion of all air which could possibly find access and acting additionally to prevent any air entering.

The invention further provides for recirculating a portion of the stock passing through the engine whereby two or more treatments are imparted to varying portions of the stock circulating through the system. The excess of stock passing off by dam 4 and pipe 5 (arrow x) receives no treatment by the refining engine, but the stock which overflows the lower dam 6 and enters the engine 8 (arrow y) receives one full treatment and a varying proportion of it (arrow z) receives one or more treatments by reason of the recirculation flow. The mixture of the stock of one or more treatments passing on to the next stage of the paper making process is indicated by arrows s and t.

While heretofore it was common to treat the fluid stock in the refining engine and then from its discharge regulate the flow to the next stage by passing it through an adjustable gate manually controlled in a regulating box, my improvements provide the additional feature of dividing the fluid stock from the engine and recirculating a portion of it for further refining and during these operations delivering the fluids of said treatments as a composite fluid to the next stage in the paper making process. As a matter of fact, in the carrying out of my invention, shortly after the circulation through the engine begins, there will be continually variable quantities of recirculated and retreated fluid stock, so as to provide a most intimate mixture of relative uniform refinement, considerably greater than can be produced by passing the fluid stock only once through the refining engine. The elimination of air permits the maintaining of a full unobstructed flow of stock through the refining engine and the overflow and recirculation removes the danger of clogging of the regulating gate aperture 14ª.

While heretofore the flow of the stock through the engine has been controlled and governed by the engine itself, by my improvements this is not so, as the control of the volume and velocity of the stock passing through the engine is independent of the refining engine itself, because the controlled supply of stock to the intake of the engine and the back pressure upon its outlet in connection with the recirculation are the potent factors which control the velocity and quantity, and these are independent of the construction of the engine itself.

By my improvements, I not only insure a more perfect refinement of the paper stock by the recirculation and re-treatment in the engine while it also treats fresh stock, but I have capacity for adjustment of parts independent of the engine and by which the extent of recirculation and refining may be regulated and insured; and whereby the degree of refinement desired may be assured without necessity of resetting or adjusting the refining engine itself.

I have described my improved method and means in that particularity which I deem to be the best exposition of my invention, and that which I prefer in commercial practice, but I do not restrict or confine myself to the minor or secondary details, as such are susceptible of modification which may be resorted to as matters of mechanical skill and without a departure from the spirit of the invention.

Having now described my invention, what I claim and desire to secure by Letters Patent is:

1. The combination with a paper stock refining engine having an inlet extending above the level of the engine so as to keep a solid body of fluid paper stock entering the engine to the exclusion of free air, a regulating box arranged above the engine having an inlet and two outlets, the inlet receiving paper stock from the engine and the outlets respectively leading to the next stage in a paper making process and communicating with the inlet to the engine, a dam arranged in the box between the inlet of the box and the outlet therefrom leading to the inlet of the engine over which refined fluid paper stock is returned to the engine for re-circulation, an adjustable orificed partition for the regulating box intermediate of the inlet thereto and the outlet leading to the next stage of the paper making process for regulating the quantity of paper stock to be returned for re-treatment in the engine, and a static head arranged between the discharge from the engine and the inlet to the regulating box whose normal height extends above the level of the dam in the regulating box.

2. The invention according to claim 1 wherein further, the inlet to the engine is provided with a feeding box having a supply inlet and an overflow outlet and which box also communicates with the outlet from the regulating box through which the paper stock is returned for recirculation through the engine, said feeding box also provided with two dams of different heights, the dam of lesser height being interposed between the supply inlet and the inlet to the engine and the other and higher dam being interposed between the supply inlet and the overflow outlet, said supply inlet having means for receiving an excess of fluid paper stock.

3. The herein described method of refining paper stock, which consists in feeding an excess of fluid paper stock to the inlet of a paper stock refining engine from a level above the engine and causing the excess beyond that necessary to keep the engine filled to be by-passed back to the source, discharging the refined paper stock from the refining engine under a back pressure, dividing a portion of the refined paper stock out of that discharged from the engine and feeding the same to the fresh stock before passing into the inlet of the engine for re-circulation through it to provide a solid body of fluid paper stock to the exclusion of air in the free state, and simultaneously discharging from out of circulation that portion of the refined stock received from the engine suitable for use and which is not being returned for re-circulation.

4. The method according to claim 3, wherein further, a static head is maintained upon the fluid paper stock passing from the engine, said static head extending above the level of the separated paper stock to be returned for recirculation.

In testimony of which invention, I hereunto set my hand.

HARRY LIEBECK.